United States Patent [19]

Hershberger

[11] Patent Number: 5,037,117
[45] Date of Patent: Aug. 6, 1991

[54] FOLDING TABLE CADDIE

[76] Inventor: Richard C. Hershberger, 15322 Lime Dr., Punta Gorda, Fla. 33955

[21] Appl. No.: 613,172

[22] Filed: Nov. 13, 1990

[51] Int. Cl.⁵ .............................................. B62B 3/10
[52] U.S. Cl. .................................... 280/79.7; 280/35; 280/641
[58] Field of Search ............... 280/638, 35, 639, 641, 280/651, 47.34, 47.35, 79.11, 79.3, 79.7; 248/166, 434

[56] References Cited

U.S. PATENT DOCUMENTS

| | | | |
|---|---|---|---|
| 1,390,123 | 9/1921 | Gilkey et al. | 280/35 |
| 2,466,149 | 4/1949 | Burg | 280/79.7 |
| 2,846,233 | 8/1958 | Burg | 280/30 |
| 4,360,211 | 11/1982 | Blake | 280/79.7 |
| 4,867,465 | 9/1989 | Dunchock | 280/79.7 X |

Primary Examiner—Andres Kashnikow
Assistant Examiner—Michael Mar
Attorney, Agent, or Firm—Gifford, Groh, Sprinkle, Patmore & Anderson

[57] ABSTRACT

A caddie for stacking, storing and transporting folding leg tables. The dollies are on casters and are simply constructed with a base and riser member. Locking bars extending from the risers of each dolly engage the edges of the first table to be stacked on the caddie. The dollies fold flat for storage.

13 Claims, 2 Drawing Sheets

FOLDING TABLE CADDIE

BACKGROUND OF THE INVENTION

1. Field of the Invention

This invention relates to a cart for storing and transporting folding leg tables. More particularly, this invention relates to a cart or caddie for storing and tranporting folding leg tables which when the caddie is not in use, can be disassembled and folded so as to occupy a minimum of space.

2. Description of the Prior Art

Folding leg tables are normally moved and sometimes stored on large four wheel carts. The platforms of these carts are substantial in order to support and balance a stack of horizontally disposed tables. When the cart is not in use, it occupies considerable space.

SUMMARY OF THE INVENTION

The present invention provides a mobile table caddie for storage of a number of uprightly stacked folding leg tables, and when the caddie is not in use, it is folded as to occupy a minimum of space. The caddie includes a pair of dollies, each dolly having a rectangular horizontally disposed base with narrow ends and longer longitudinal sides. A pair of rollers, preferrably in the form of casters, are used to support the base, one caster being located at each end of the base. A riser is pivotally mounted adjacent to one end of the base, and a stabilizer bar is connected between the top portion of the riser and the base, outwardly from the riser so as to be at an angle from the vertical. Preferably, this angle is approximately 15° from the vertical. A locking arm is detachably connected to the upper end of the riser when the caddie is in its use position. Each of the pair of dollies are arranged spaced from each other with the longitudinal sides of their bases being parallel to receive the tables to be stored. The locking arm on one dolly extends towards the locking arm on the other dolly. Each of the locking arms has a hook at its free end to engage the edge of first table to be stacked. This first table is supported on the bases of the two dollies and rests against the risers or stabilizing bars. Once the first table has been supported on the two dolly bases and is locked into position by the hooks on the locking arms extending from the dollies, the structure is very stable so that the additional tables can be easily leaned against the first table to be stored in a substantially vertical position. The additional tables increase the stability of the caddies.

In addition to the riser being pivotally connected to the base, the stabilizer bar is pivotally connected between the riser and the base with one end being detachably connected as by a screw and thumb nut. When it is desired to store the caddie, the thumb nut is removed to free one end of the stabilizing bar so that the bar and the riser can be pivoted to a position where the riser rests on the top of the base.

In a preferred form of the embodiment, the base includes a number of spaced supports for supporting the bottom edges of the tables relative to the base. These supports can take the form of wire cleats with their ends being engaged in spaced holes on the base for easy assembly and disassembly if desired.

In a preferred embodiment of the invention, a clip is used to temporarily engage the free ends of the locking arms to retain the dollies in a upright position until the first table is placed on the caddie.

Another preferred embodiment of the invention involves the use of channel members for the base and riser. The flat surface of a channel is faced upward to form the rectangular table supporting base with the channel legs pointing downward to form the longitudinal sides of the base. Likewise, a channel is used for the riser with the channel legs extending over the base. Preferably, the locking arms are tubular and are pivotally connected to the riser by a horizontally disposed sleeve which accepts one end of the locking arm. This permits the locking arm to be pivoted so as to engage a hook at the other end of the locking arm with the edge of the first table.

DRAWING

The numerous advantages and features of the present invention will be apparent from the detailed description when used in conjunction with the drawing in which:

FIG. 1 is a perspective view of the caddie in its use position with a first table shown in phantom lines supported on the bases of the spaced dollies leaning against the risers of the dollies and being locked to the dollies by the hook ends of the locking arms; a clip is shown in an exploded position above the locking arms to demonstrate how it can be attached to both locking arms to retain the dollies with their risers in a vertical position to accept the first table to be loaded on the dolly;

DETAILED DESCRIPTION OF THE PREFERRED EMBODIMENTS

Figure 1:
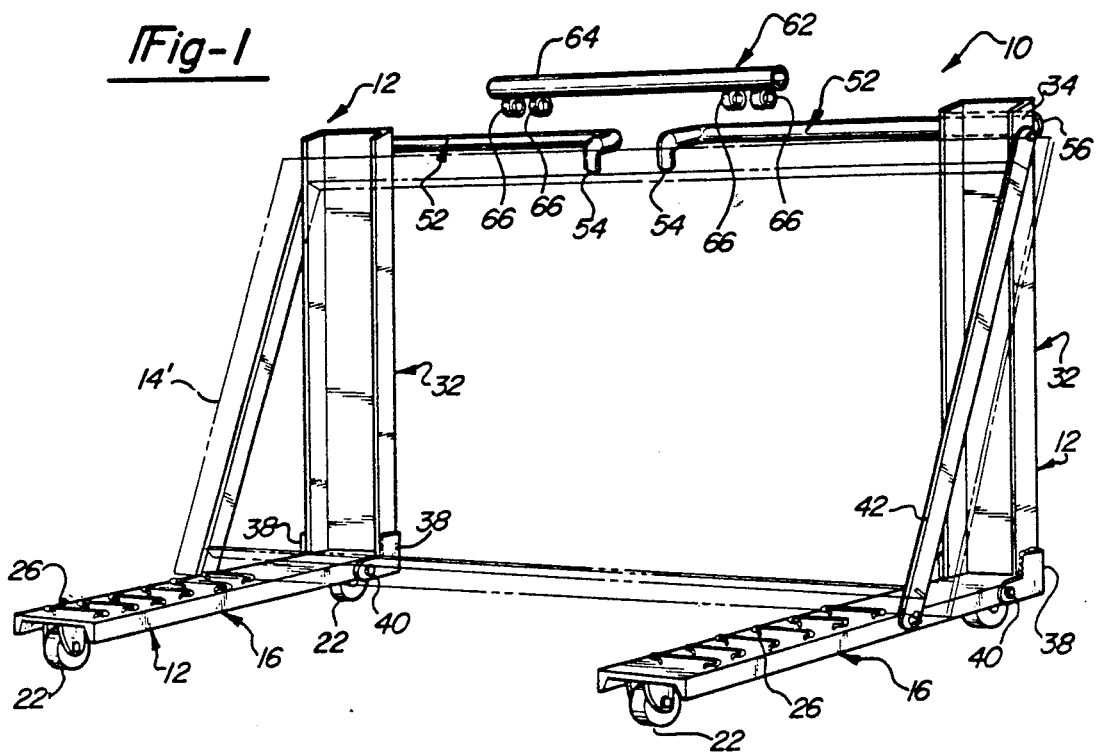
Figure 2:
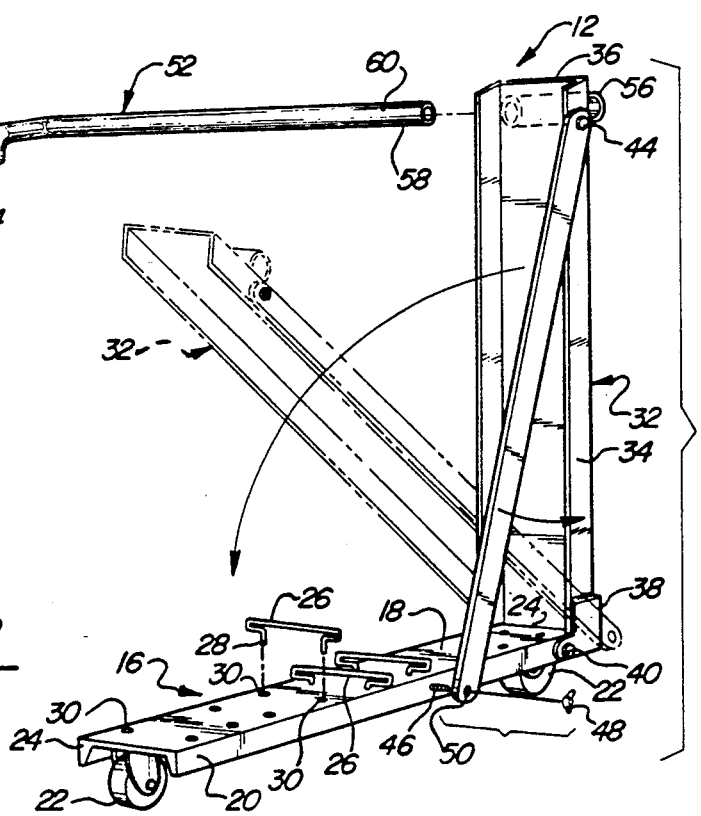
FIG. 2 is a perspective view of one of the dollies showing the locking arm exploded to illustrate its assembly to the riser, and showing the riser in phantom as it is being pivoted from a use position to a storage position; removable table edge supports are also shown in position and in an exploded position to indicate their manner of attachment to the base of the dolly.

Referring to FIG. 1, the mobile table caddie 10 is shown as including a pair spaced apart dollies 12 which support a number of folding leg tables 14 which are stacked on the dollies in a substantially vertical or slightly inclined position. The first of these tables to be stacked is shown in phantom at 14'.

Each of the dollies 12 include a horizontally disposed base 16 preferably fabricated from a channel shaped member for maximum strength and rigidity. The flat surface of the channel faces upward to present the table supporting surface 18 with the legs of the channel pointing downward constituting the longitudinal sides 20 of the base. A pair of casters 22 are located adjacent the opposite ends 24 of the base to support the base for rolling movement.

Edge supports 26 are used to support the bottom edge of tables. These supports 26 are shown as having been formed as a wire cleat having legs 28 which are inserted into aligned holes 30 in the table supporting surface 18 of base 16.

A vertical riser 32 is constructed from a channel shaped member with the channel legs 34 extending over the table supporting surface 18 and the flat surface 36 of the channel facing rearwardly. Riser 32 is pivotally mounted to the base 16 by angle brackets 38 which are permanently fixed to the riser channel legs 34 and pivotally mounted to the longitudinal channel leg sides 20 of base 16 by a pin or pins 40.

Figure 3:
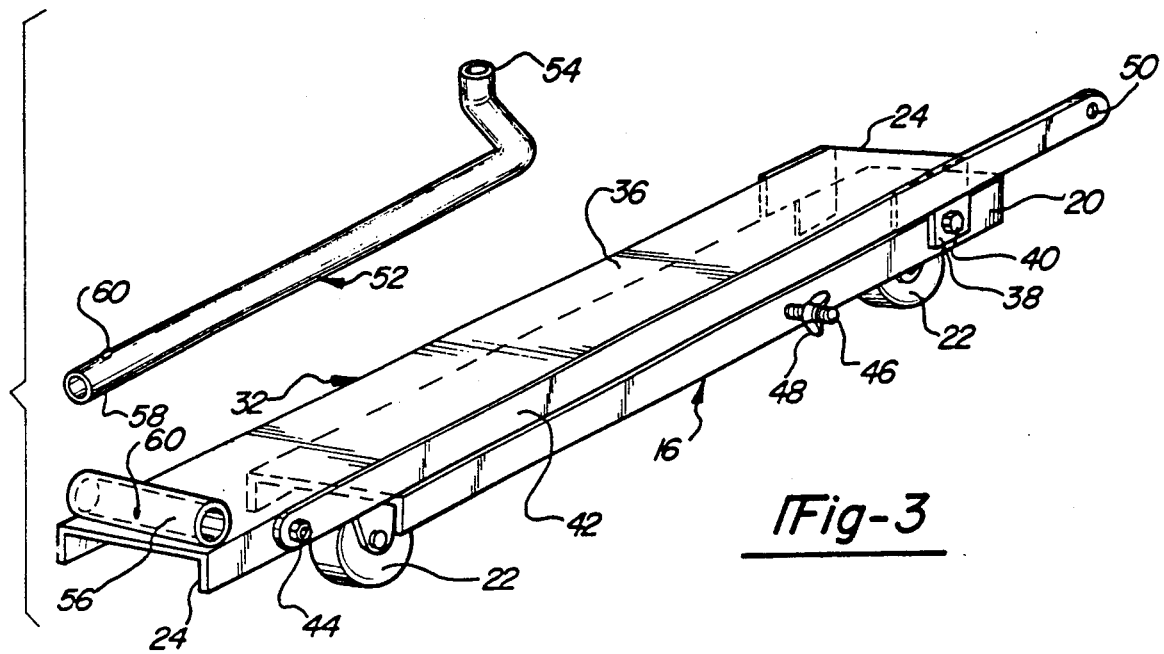
FIG. 3 shows a dolly partially disassembled and pivoted into its storage position.

The stabilizer bar 42 joins the base 16 and the riser 32 to hold the riser in its vertical position. Preferably the stabilizer bar is pivotally connected at one end and detachably connected at its other end. Also preferrably, the bar is pivotally connected adjacent the top of the riser by a pin 44 passing through the riser channel leg 34. The connection of the other end to the base is made outwardly from the riser a distance so that the angle of the stabilizer bar is approximately 15° from the vertical. This provides an optimum angle for stacking the tables. This connection to the base 16 is made through the longitudinal base side 20 by a stud 46 and wing nut 48. The bar 42 is provided with an aperture 50 through which the stud 46 projects. The aperture 50 can also be replaced by a slot into which the stud 46 is slid for assembly. By providing the pivotal connection 44 to the riser, the bar 42 can be pivoted at the same time the riser is pivoted to the storage position shown in FIG. 3.

Figure 4:
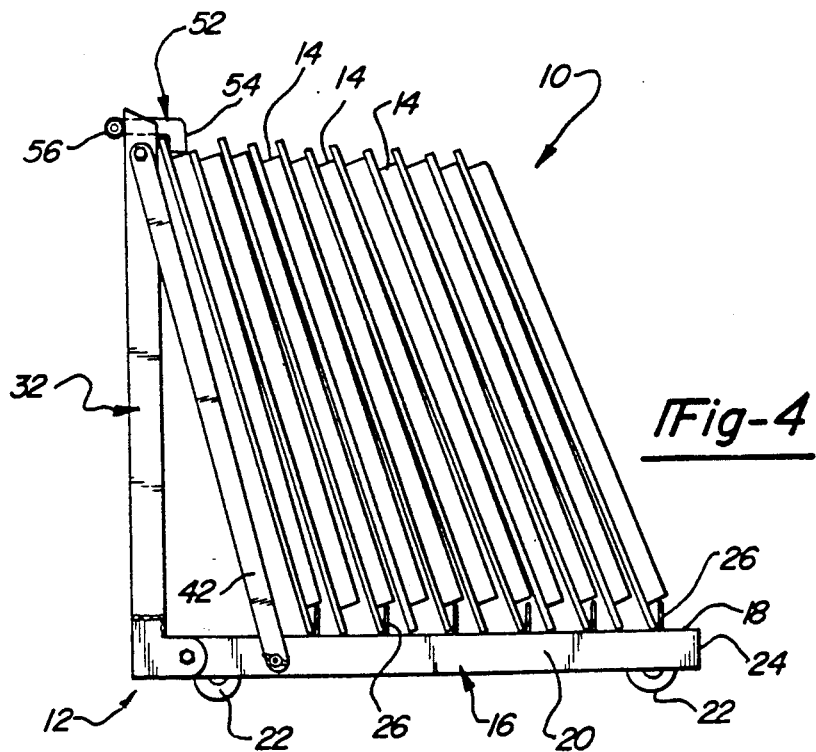
FIG. 4 is an end view of the caddie showing a number of folding leg tables being supported in their storage position.

A locking bar 52 having a hook 54 at one end is secured to the flat face 36 of riser channel 32 by sleeve or cylindrical bearing member 56. The stabilizer bar 52 is tubular so that its free end 58 can be inserted into the sleeve 56 for rotational movement in order to swing the hook 54 over the inside edge of a table as shown in FIGS. 1 and 4. Both the sleeve and the stabilizer bar can be provided with holes 60 through which a pin, such as a common ten pennyweight nail can be inserted to lock the bar in its engaged position with the first table.

The caddie is assembled by pivoting the riser 32 into its vertical position and maintaining it in this position by pivoting the stabilizer bar 42 into position with its aperture 50 slid over the stud 46 on the base 16. The thumb nut 48 is threaded on to secure the stabilizer bar. When both of the dollies have been upfolded and assembled in this fashion with their bases spaced apart and parallel to each other, the locking bars are inserted into their respective sleeves so that the locking bars face each other as shown in FIG. 1. A table can then be rested on the bases and the riser so that the locking bars can be pivoted to engage the hooks 54 with the edge of the table. Once this first table has been put into place, the dollies will remain stable for stacking the balance of the tables to be stored as shown in FIG. 4. As an aid to stacking the first table a clip 62 can be snapped over the locking bars 52 to maintain the two dollies in their erect position. Clip 62 includes a rod 64 with spring clip members 66 which spring apart to engage the straight tubular portion of the locking bars 52 as shown in FIG. 1.

Many modifications of the forgoing caddie concept can be made without departing from the spirit of the invention. Typically, for example, the stabilizing bars 42 can be padded and the first table stacked so as to lie against the stabilizing bars rather than against the top of the riser. The risers, bases, stabilizing bars and locking bars can all be made from aluminum or from a reinforced fiberglass plastic composition which is readily available. In some instances, the channels and bars can be made from stamped or extruded steel.

The embodiments of the invention in which an exclusive property or privilege is claimed are defined as follows:

1. A mobile table caddie for storage of a plurality of uprightly stacked folding leg tables comprising:
a pair of dollies, each dolly including:
a rectangular horizontally disposed base having relatively narrow ends and longer longitudinal sides;
a pair of rollers, one adjacent each end of said base for supporting the base for rolling movement;
a riser pivotally mounted adjacent one end of said base;
a stabilizer bar connected, when said caddie is in its use position, between the top of said riser and said base outwardly from said riser to be at an angle from the vertical with the riser being substantially vertical;
a locking arm detachably connected at one end to the upper end of said riser when said caddie is in its use position, and when each of said pair of dollies are arranged spaced from each other with the longitudinal sides of their bases parallel to receive tables to be stored, the locking arm on one dolly extending toward the locking arm on the other dolly but spaced therefrom, each of said locking arms having a hook formed at a free end, said hook having a portion extending transversely from said locking bar and a portion extending downwardly from said transversely extending portion for engaging an upper edge of a first table to be stacked with the upper edge of the first table extending between said downwardly extending portion of said hook and said locking arm and with a lower edge of said first table being supported on the bases of said dollies and resting against the stabilizing bars thereof; and
means on said base for maintaining the bottom edge of said first table in position on said bases.

2. The table caddie of claim 1 wherein said rollers are casters for pivotal movement.

3. The table caddie according to claim 1 wherein said stabilizer bar is pivotally connected to one of the risers and base and is detachably connected to the other of said riser and base so that said stabilizer bar can be disconnected at one end and the riser can be pivoted to a storage position resting on said base.

4. The table caddie according to claim 3 wherein said stabilizer bar is pivotally connected to said riser and is detachably connected to said base so that the stabilizer bar can be disconnected from said base and pivoted with said riser to a storage position above said base.

5. The table caddie according to claim 1 wherein said stabilizer bar is connected to said base at a point so that said locking bar is secured at an angle of approximately 15° to the vertical.

6. The table caddie of claim 1 further including a plurality of longitudinally spaced supports on said base for supporting the bottom edges of the tables being stacked on said caddie.

7. The table caddie according to claim 6 wherein said supports include wire cleats with ends engaging spaced holes on said base to be removably attached to said base.

8. The table caddie according to claim 1 wherein said locking arm is pivotally attached to said riser so that it may be pivoted to engage said hook with the upper edge of said table.

9. The table caddie of claim 1 further including a clip for temporarily engaging the free ends of said locking arms to retain the dollies in an upright position until a first table is placed on said caddie.

10. A mobile table caddie for storage of a plurality of uprightly stacked folding leg tables comprising a pair of dollies, each dolly including:
a horizontally disposed channel member having the flat surface of the channel facing upward to form a rectangular table supporting base, the channel legs pointing downward to form longitudinal sides of said base and the open ends of the channel forming the ends of said base;

a pair of casters between said longitudinal sides, one adjacent each end of said base for supporting the base for rolling movement;

a channel pivotally attached at one end of said base with its channel legs extending over said base to form a riser;

a stabilizer bar pivotally attached to one of the channel legs at the free end of said riser and detachably attached to one of the longitudinal sides of said base outwardly from said riser to be at a small angle from the vertical with the riser being substantially vertical in the use position of said caddie;

a locking arm having one end detachably connected adjacent to the upper free end of said riser when the caddie is in its use position, the other, free, end of said arm having a table engaging hook formed thereon, said hook having a portion extending transversely from said locking bar and a portion extending downwardly from said transversely extending portion for engaging an upper edge of a first table to be stacked wherein when the caddie is in its use position, the dollies are spaced from each other with the longitudinal sides of said bases parallel and the locking arms of each dolly extend toward each other but spaced therefrom; and means on said base for maintaining a bottom edge of said first table in position on said bases;

whereby the first table to be stacked for storage will have a lower edge extending between and supported on said bases resting against said risers with the hooks of said locking arms engaging the upper edge of said first table, said upper edge extending between said downwardly extending portion of said hook and said locking arm; and whereby the locking arms can be detached from the upper ends of said risers, said stabilizer bars can be detached from said bases, and said risers can be pivoted to a storage position resting on said bases.

11. The table caddie according to claim 10 further including a clip detachably engaging said locking arms adjacent said hooks for retaining the dollies with their risers in an upright position until the first table is placed on the caddie.

12. The table caddie according to claim 10 wherein said riser is pivotally attached to said base by brackets attached to the channel legs of said riser and pivoted to the longitudinal sides of said base.

13. The table caddie according to claim 10 wherein said locking arm is tubular and is pivotally connected to said riser by a sleeve on the flat surface of the riser channel, one end of said tubular locking arm being inserted into said sleeve allowing the arm to be pivoted to engage said hook with the upper edge of said table.

* * * * *